A. K. ROWND.
NURSERY SEAT.
APPLICATION FILED JUNE 16, 1919.
1,328,900.
Patented Jan. 27, 1920.
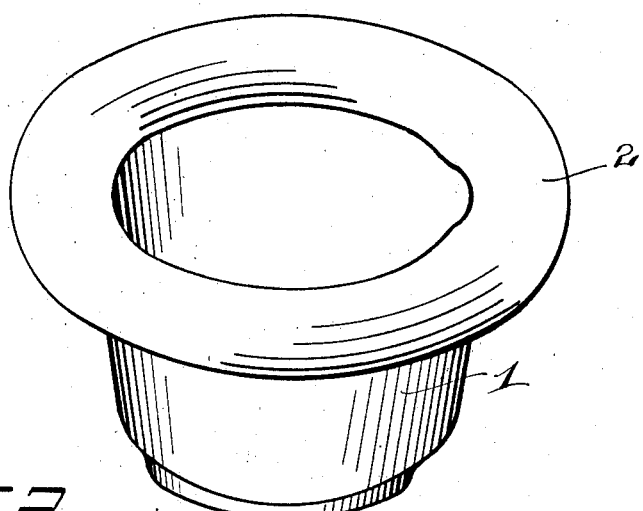
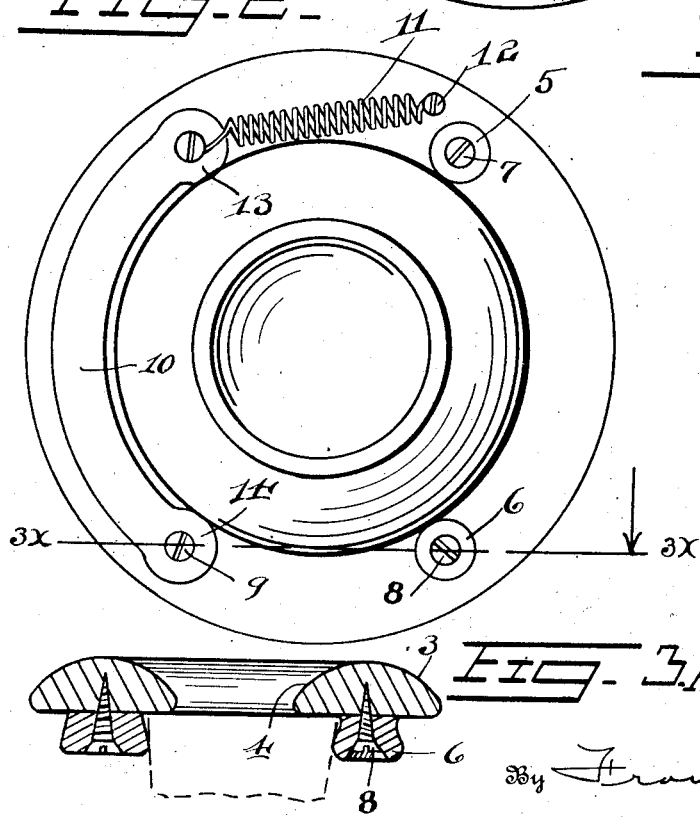
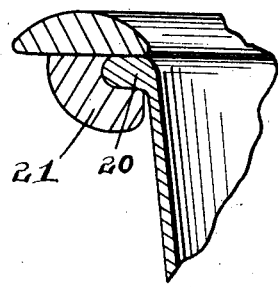
Inventor
ANNIE K. ROWND.
By Frank Keifer
Attorney

UNITED STATES PATENT OFFICE.

ANNIE K. ROWND, OF ROCHESTER, NEW YORK.

NURSERY-SEAT.

1,328,900.

Specification of Letters Patent. Patented Jan. 27, 1920.

Application filed June 16, 1919. Serial No. 304,530.

*To all whom it may concern:*

Be it known that I, ANNIE K. ROWND, a citizen of the United States, residing at Rochester, in the county of Monroe and State of New York, have invented certain new and useful Improvements in Nursery-Seats, of which the following is a specification.

The object of this invention is to provide a seat to which a bowl may be attached and from which it may be detached at will, the combination serving as a toilet for a child.

This and other objects of the invention will be illustrated in the drawings, described in the specification and pointed out in the claims at the end thereof.

In the drawings,

Figure 1 is a perspective view of the seat and bowl.

Fig. 2 is a bottom plan view of the bowl and seat, looking at it from below.

Fig. 3 is a section on the line 3×—3× of Fig. 2.

Fig. 4 is a modification of the bowl and seat.

In the drawings, like reference numerals indicate like parts.

Reference numeral 1 indicates an ordinary procelain bowl such as is commonly sold, the bowl having a flat bottom and a substantially straight edge at the top as shown in Fig. 3. The seat 2 consists of a disk cut away at the center to an annular shape, the top of it being rounded off as indicated at 3 and 4 in Fig. 3. To the bottom of this disk are fastened stationary lugs or buttons 5 and 6, which are held thereon by screws 7 and 8. Pivotally mounted on the bottom of the seat at 9 is the lever 10, the free end of which is connected to a spring 11, which spring is fastened at 12 to the seat. This lever has an enlarged end 13 which is intended to bear against the bowl and it is also enlarged at its pivot as indicated at 14 so as to form a bearing against the bowl as well. The bowl may be inserted by swinging the lever 10 to the left in Fig. 2 and inserting the bowl in its proper position, after which the spring is allowed to draw the lever back into position against the bowl by which the bowl will be held firmly in place against the buttons 5 and 6. It is sufficient if the lever makes contact with the bowl at the one place, forcing it against the two stationary buttons, the bowl being then held in place by three points of contact. The parts may be positioned so that the pivot 14 will make contact as well, although this last is not necessary. By swinging the lever 10 to the left, the bowl may be removed. The lever clamps the bowl with sufficient force so that the bowl will remain suspended from the seat so that it may be lifted thereby.

The buttons 5 and 6 are preferably made of rubber or some other elastic material so that the hold which the combination makes on the bowl, is increased thereby.

In Fig. 4 I have shown a modification of the seat and bowl in whch the bowl is shown with a flange 20, the buttons being shown with hooked ends, as indicated at 21. By this device a more positive engagement between the bowl and seat may be secured.

I claim:

1. A nursery seat comprising an annular top, lugs projecting downwardly therefrom, and a swinging lever having a projection thereon, the lugs and projection and lever being adapted to engage the top of a bowl and fasten the seat thereto.

2. A nursery seat comprising an annular top, lugs projecting downwardly therefrom, a swinging lever having a projection thereon, the lugs and projection and lever being adapted to engage the top of a bowl and fasten the seat thereto, and a spring for yieldingly holding the lever against the bowl and forcing it into engagement with the lugs.

In testimony whereof I affix my signature.

ANNIE K. ROWND.